(12) United States Patent
Lin et al.

(10) Patent No.: US 9,824,253 B2
(45) Date of Patent: Nov. 21, 2017

(54) APERTURE SENSING STRUCTURE FOR LIGHTING FINGERPRINT

(71) Applicant: TRON Intelligence, Inc., Hsinchu County (TW)

(72) Inventors: Ruey Jiann Lin, Hsinchu (TW); Po Liang Huang, Hsinchu (TW)

(73) Assignee: Tron Intelligence Inc., Zhubei, Hsinchu County (TW)

( * ) Notice: Subject to any disclaimer, the term of this patent is extended or adjusted under 35 U.S.C. 154(b) by 121 days.

(21) Appl. No.: 15/040,052

(22) Filed: Feb. 10, 2016

(65) Prior Publication Data

US 2017/0193269 A1 Jul. 6, 2017

Related U.S. Application Data

(60) Provisional application No. 62/114,659, filed on Feb. 11, 2015.

(51) Int. Cl.
*G06K 9/00* (2006.01)

(52) U.S. Cl.
CPC ....... *G06K 9/00013* (2013.01); *G06K 9/0004* (2013.01); *G06K 2009/0006* (2013.01)

(58) Field of Classification Search
CPC ............. G06K 9/0002; G06K 9/00013; G06K 9/00087; G06K 2009/0006; G06K 9/0004; G06F 3/016; G06F 3/0338; G06F 3/041; G06F 3/0416; G06F 3/044; H04N 5/23241; H04N 5/3765; H04N 5/378
See application file for complete search history.

(56) References Cited

U.S. PATENT DOCUMENTS

| | | | |
|---|---|---|---|
| 2008/0123908 A1* | 5/2008 | Waldman | G06K 9/00046 382/124 |
| 2014/0140588 A1* | 5/2014 | Chou | G06K 9/0002 382/124 |
| 2014/0218802 A1* | 8/2014 | Saito | G01J 3/26 359/578 |
| 2016/0275333 A1* | 9/2016 | Lin | G06K 9/00053 |
| 2017/0147851 A1* | 5/2017 | Wang | G06K 9/0002 |

* cited by examiner

*Primary Examiner* — Yon Couso
(74) *Attorney, Agent, or Firm* — Rosenberg, Klein & Lee

(57) ABSTRACT

An aperture sensing structure for lighting fingerprint which is applied in the field of the fingerprint identification optical system mainly includes a circuit board, a base, a light source device, and a sensing device are arranged on the circuit board. A lighting ring is arranged and covered on the circuit board so as to make a light source of the light source device evenly distribute on the base and the sensing device. The present invention may not only effectively shield the interference of the stray lights, but also the light source may be provided evenly for lighting the finger to effectively identify the fingerprint after the light source of the light source device is guided by the lighting ring.

4 Claims, 3 Drawing Sheets

APERTURE SENSING STRUCTURE FOR LIGHTING FINGERPRINT

FIELD OF THE INVENTION

The present invention relates to an aperture sensing structure for lighting fingerprint which is applied in the field of the fingerprint identification optical system. It is mainly used a lighting ring covered on a light source device of a circuit board to achieve the effects of effectively shielding the interference of light, making light source evenly distribute, and improving the sensitivity of fingerprint identification.

BACKGROUND OF THE INVENTION

The identification optical structure of a conventional fingerprint identification system is shown as FIGS. 1 and 2. It mainly includes a Printed Circuit Board (PCB) 1, a base 11, a light source device 12, and a blocking device 13 are arranged on the PCB 1. A sensing device 111 is arranged on the base 11. Finally, a transparent colloid 14 is packaged on the PCB 1. The blocking device 13 is arranged in order to effectively shield the stray lights from interfering the reading of the sensing device 111. However, this kind of structure still may not shield the interference of the stray lights. At the same time, the light source is distributed unevenly to make the identification system insensitive and decrease the yield rate due to the existence of the blocking device 13.

In order to solve the problems of the above mentioned structure of FIGS. 1 and 2, a structure is invented by the applicant which has the effects of effectively shielding the interference of the stray lights, effectively increasing the precision and sensitivity of reading of the sensing device, and improving the yield rate.

Accordingly, the inventor of the present invention has devoted himself based on his many years of practical experiences to solve this problem.

An aperture sensing structure for lighting fingerprint of the present invention is applied in the field of the fingerprint identification optical system. It is mainly used a lighting ring covered on a light source device of a circuit board to achieve the effects of effectively shielding the interference of light, making light source evenly distribute, and increasing the sensitivity of fingerprint identification.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
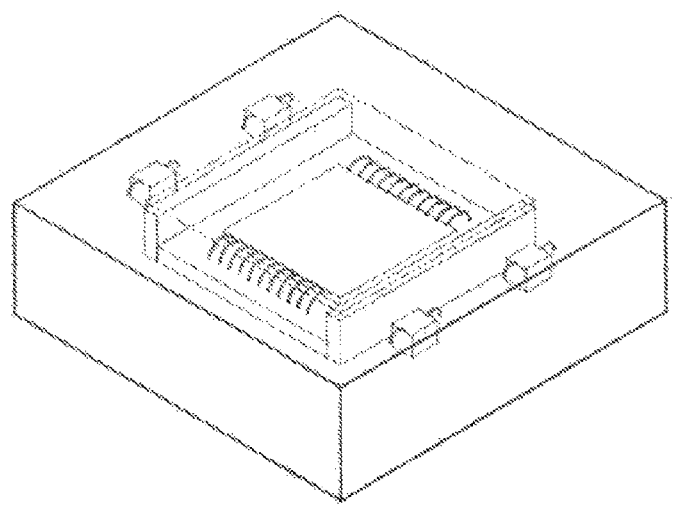
FIG. 1 is a perspective view of a conventional fingerprint identification device of a fingerprint identification system.
Figure 2:
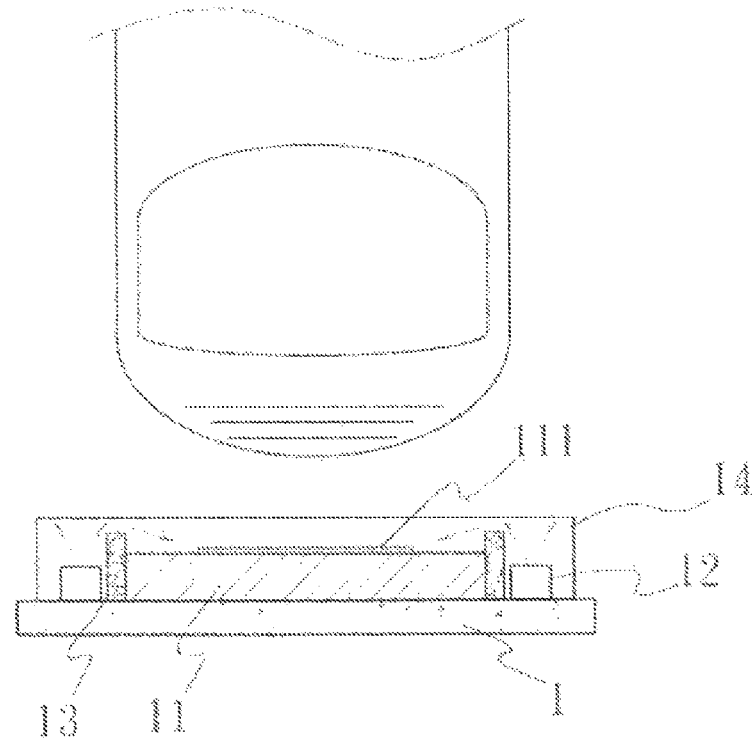
FIG. 2 is a cross-sectional view of the conventional fingerprint identification device.

Referring now to the drawings where like characteristics and features among the various figures are denoted by like reference characters.

Figure 3:
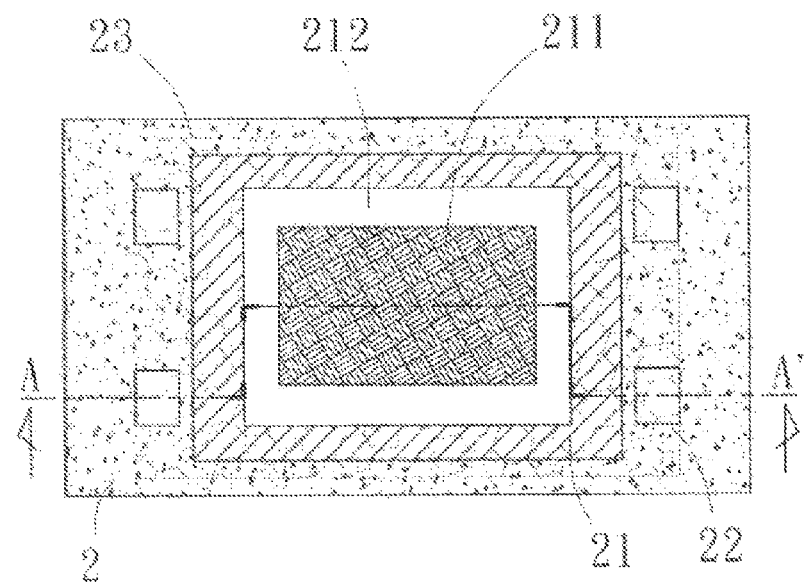
FIG. 3 is a top view of an aperture sensing structure for lighting fingerprint of the present invention.
Figure 4:
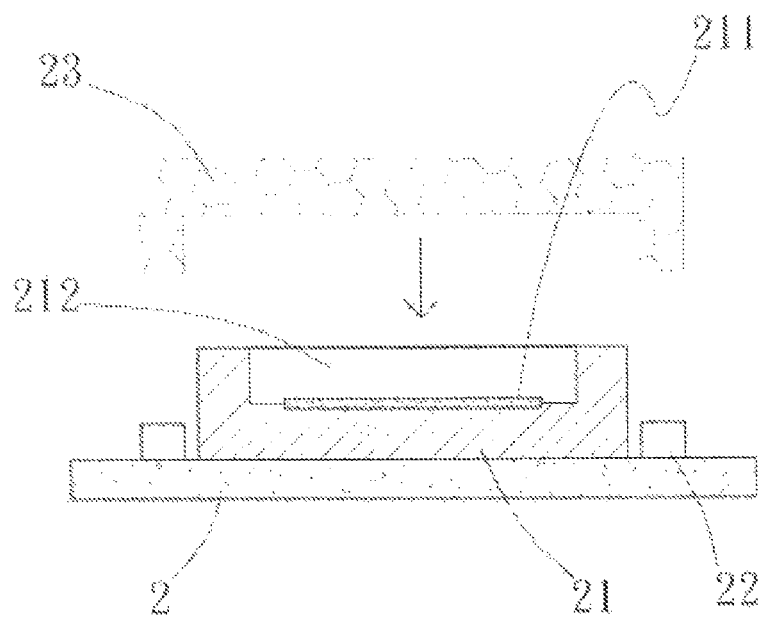
FIG. 4 is a cross-sectional view of FIG. 3 along line A-A' while packaging.
Figure 5:
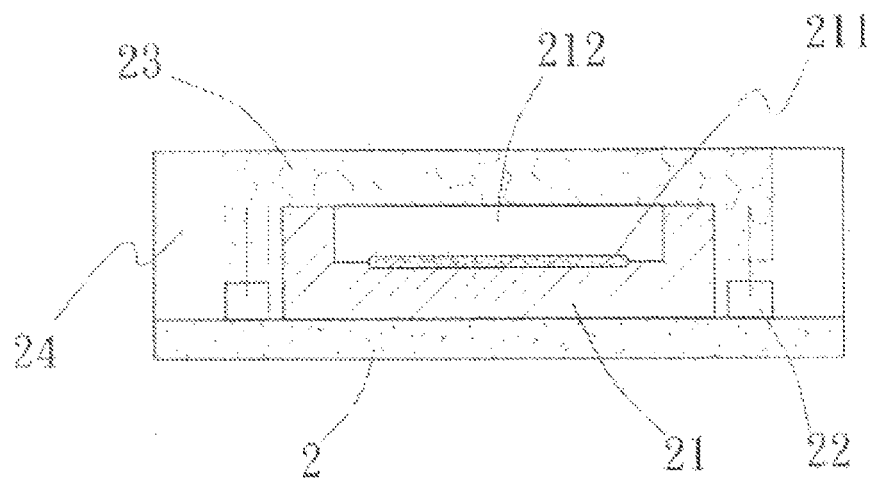
FIG. 5 is a cross-sectional view of FIG. 3 along line A-A' after packaging.
Figure 6:
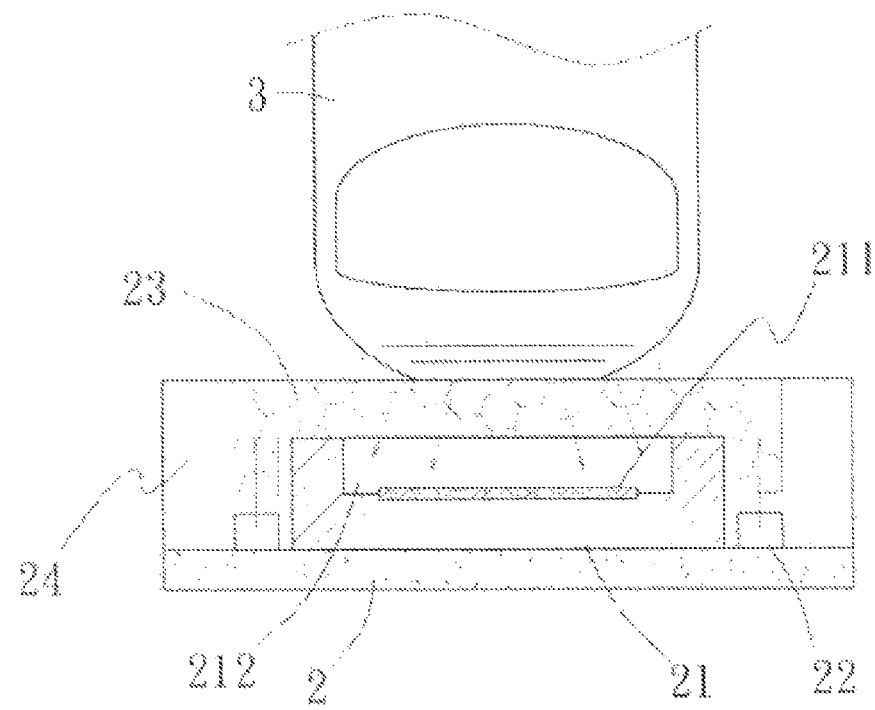
FIG. 6 is a cross-sectional view of FIG. 3 along line A-A' while operating.

Please refer to FIGS. 3, 4, 5 and 6, an aperture sensing structure for lighting fingerprint of the present invention mainly comprises a circuit board 2, a light source device 22, a lighting ring 23, a cover glass 212, and a package 24. A base 21 and the light source device 22 are arranged at the circuit board 2. A sensing device 211 is arranged on the base 21 for reading and identifying the fingerprint. The light source device 22 is generally an Infrared Light-Emitting Diode (IR LED), but not limited thereto.

The lighting ring 23 is made by solid dielectric materials so as to be advantageous to the light source to distribute and an edge of the lighting ring 23 is arc so as to be advantageous to the light source to travel and make the light source evenly distributed in the lighting ring 23.

When assembling, the base 21 and the light source device 22 are arranged on the circuit board 2 and a light emitting point of the light source device 22 is arranged upwardly. At the same time, the sensing device 211 is arranged at a suitable position above the base 21. The sensing device 211 is electrically connected to the circuit board 2 via the base 21. And then, the lighting ring 23 is arranged above the light emitting point of the light source device 22 for positioning. The cover glass 212 is arranged between the sensing device 211 and the lighting ring 23. The cover glass 212 is mainly used for protecting the sensing device 211, projecting the fingerprint, and supporting the pressure of the finger. Finally, the package 24 is packaged on the circuit board 2.

When operating, the finger 3 of an operator is put on the lighting ring 23 and simultaneously the light source device 22 is activated to project an IR light source so that the IR light source may be evenly projected into the lighting ring 23 and evenly distributed in the lighting ring 23. When the finger 3 of the operator is put above the lighting ring 23, the lighting ring 23 may provide the light source for lighting the finger and make the fingerprint of the finger 3 reflect much clearer so that the sensing device 211 may quickly read and identify a high quality image of the fingerprint.

In conclusion, compared to the conventional fingerprint imaging structure, the aperture sensing structure for lighting fingerprint of the present invention may effectively shield the interference of light and effectively and evenly distribute the light source into a sensing range of the sensing device 211 to make the reading of the sensing device 211 more effectively and further increase the sensitivity and the yield rate of the products of the fingerprint identification system.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. An aperture sensing structure for lighting fingerprint, comprising: a circuit board, having a base, and a sensing device is arranged on the base; a light source device, arranged on the circuit board and located at one side of the base; a lighting ring, arranged on the base and the sensing device; and one side of the lighting ring is located on a light emitting point of the light source device, and the light source device is activated to project a light source and the light source is evenly projected into the lighting ring and evenly distributed in the lighting ring; a cover glass, arranged between the sensing device and the lighting ring; and a package, packaged the circuit, the base, the sensing device, the light source device, and the lighting ring, wherein the lighting ring has an aperture over the sensing device and the cover glass to expose the cover glass, and when a finger of an operator is put above the lighting ring, the finger reflects the light source provided by the lighting ring to the sensing device via the aperture and the cover glass.

2. The structure as claimed in claim 1, wherein the light source device is an IR LED (Infrared Light-Emitting Diode).

3. The structure as claimed in claim 1, wherein the lighting ring is made by solid dielectric materials.

4. The structure as claimed in claim 1, wherein an edge of the lighting ring is arc.

* * * * *